United States Patent
Glingener et al.

(10) Patent No.: US 7,209,665 B2
(45) Date of Patent: Apr. 24, 2007

(54) CONTROL CONCEPT FOR A MULTISTAGE POLARIZATION MODE DISPERSION COMPENSATOR

(75) Inventors: Christoph Glingener, Feldkirchen-Westerham (DE); Klaus Kotten, Munich (DE); Erich Gottwald, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 620 days.

(21) Appl. No.: 10/238,452

(22) Filed: Sep. 10, 2002

(65) Prior Publication Data

US 2003/0072513 A1    Apr. 17, 2003

(30) Foreign Application Priority Data

Sep. 10, 2001    (DE)    ................. 101 44 357

(51) Int. Cl.
  *H04B 10/12*    (2006.01)
  *H04B 10/08*    (2006.01)
  *H04B 17/00*    (2006.01)

(52) U.S. Cl. ........................ 398/147; 398/29

(58) Field of Classification Search .............. 398/29, 398/81, 147–150, 159, 177, 204, 205, 206, 398/207, 208, 209, 136
See application file for complete search history.

(56) References Cited

U.S. PATENT DOCUMENTS 5,930,414 A    7/1999   Fishman et al.
6,385,357 B1 *  5/2002  Jopson et al. ............. 385/11
6,654,103 B2 * 11/2003  Yu et al. .................. 356/73.1

* cited by examiner

Primary Examiner—Shi K. Li
(74) Attorney, Agent, or Firm—Bell, Boyd & Lloyd LLP

(57) ABSTRACT

An apparatus is provided for compensating for polarization mode dispersion which is caused during transmission of a light wave via an optical waveguide, to an optical communication network having such an apparatus, and a method for compensating for polarization mode dispersion which is caused during transmission of a light wave via an optical waveguide is also provided. The apparatus has at least one first and one second polarization mode dispersion compensation device, and a control device which controls at least the first polarization mode dispersion compensation device, with the light wave being supplied first of all to the first compensation device, which at least partially carries out polarization mode dispersion compensation on the supplied light wave, and with the light wave which is emitted from the first compensation device then being supplied to the second compensation device, which carries out further polarization mode dispersion compensation on the light wave, wherein the apparatus has a PMD detection device, which provides information relating to the polarization mode dispersion of the light wave that is emitted from the first compensation device, and the first compensation device is controlled by the control device using the information relating to the polarization mode dispersion of the light wave that is emitted from the first compensation device.

10 Claims, 3 Drawing Sheets

FIG 3

CONTROL CONCEPT FOR A MULTISTAGE POLARIZATION MODE DISPERSION COMPENSATOR

BACKGROUND OF THE INVENTION

The present invention relates to an apparatus for compensating for polarization mode dispersion (PMD) which is caused during transmission of a light wave via an optical waveguide, and to an optical communication network having such an apparatus.

The present invention also relates to a method for compensating for polarization mode dispersion (PMD) which is caused during transmission of a light wave via an optical waveguide.

In optical message transmission methods, light waves that are emitted from a transmitter are fed into an optical waveguide (LWL) and are transmitted via this optical waveguide (LWL) to a receiver. Optical waveguides may be composed, for example, of quartz or a specific quartz glass, or alternatively, they may be composed, for example, of normal glass or plastic. In "optical fibers" such as these, the "core" of the fiber generally has a refractive index $n_K$, which is somewhat higher than the refractive index $n_M$ of the "cladding" which surrounds the core. This can be achieved, for example, by appropriate doping with other atoms.

The light which is used may, for example, be at a wavelength which is in the band between 1200 nm and 1800 nm.

In OTDM message transmission methods (OTDM=Optical Time Division Multiplexing), a signal which is transmitted via an optical waveguide, contains a number of signals (signal elements), to each of which one or more time slots is allocated.

If, by way of example, the respective signal (signal element) is intended to be used for transmitting a bit "1", the respective transmitter transmits, for example, a so-called RZ pulse (RZ=Return to Zero) in the time slot allocated to the respective signal (signal element). If, instead of this, a bit "0" is intended to be transmitted, the respective transmitter does not feed any pulse into the optical waveguide in the corresponding time slot.

In optical communication networks, the light waves which are fed into the transmitter to the optical waveguide (LWL) are transmitted to the receiver via one or more network nodes, which are connected to one another via further optical waveguides. In the process, the interference caused by noise, crosstalk, delay time differences, etc., accumulates.

Optical regenerators, for example, so-called 3R regenerators, are used to compensate for the interference effects. A received optical signal is amplified, retimed and reshaped in a 3R regenerator (Reamplifying, Retiming, Reshaping) and is then passed on.

Particularly in the case of optical message transmission methods in which data is transmitted at high rates (10 Gbit/s or more), the path length which can be bridged without regenerators may be restricted by polarization mode dispersion (PMD). Polarization mode dispersion (PMD) may be caused, for example, by small asymmetries and by mechanical stresses in the core of the optical waveguide.

Polarization mode dispersion (PMD) leads to group delay times of different magnitude in the optical waveguide for different input polarization states. Signal distortion therefore may occur as a function of the respective input polarization.

The polarization mode dispersion behavior of an optical waveguide can be described approximately in the form of a model by a large number of birefringent elements connected in series whose optical (major) axes are, in each case, rotated with respect to one another.

Birefringent characteristics are provided, for example, by a large number of crystals, such as calcite, quartz, mica or tourmaline. Some substances may become birefringent when electrical fields are applied because the fields polarize the corresponding molecules.

In birefringent bodies, for example, crystals, the phase velocity of electromagnetic waves, for example, light waves, passing through them depends inter alia on the propagation direction of the waves with respect to the crystal axes and on the oscillation direction.

When they pass through birefringent bodies, light waves are generally split into two light wave bundles. The abovementioned optical axis is that direction in the body which is distinguished by the fact that the light waves which pass through the body parallel to it are not split.

An optical waveguide (or its approximate model in the form of the abovementioned birefringent elements connected in series) has two mutually perpendicular input polarization states (PSP=Principal States of Polarization), for which the output polarization states are, to a first approximation, independent of the wavelength of the respective light wave. The maximum differential group delay time (DGD) occurs between these two polarization states.

The two orthogonal PSP input polarization states, and the (maximum) differential group delay times, may vary with time owing to temperature changes, movements of the optical waveguide, etc. Thus, the signal distortion at the output of the optical waveguide likewise varies with time.

Differential group delay time compensators (PMDC=polarization mode dispersion compensator) are used to compensate for signal distortion occurring at the output of an optical waveguide. A differential group delay time compensator is intended to ensure that error-free data transmission is possible despite the polarization mode dispersion (PMD) which occurs during transmission of the light wave via the optical waveguide.

Conventional differential group delay time compensators have one or more PMD compensation devices, each of which has, for example, a polarization control device and a downstream birefringent element.

The light wave which emerges from the optical waveguide is supplied to the input of the differential group delay time compensator or to the (first) polarization control device in the (first) compensation device, and may then be supplied to further compensation devices. A (small) proportion of the light wave which emerges from the differential group delay time compensator or from the (final) compensation device is emitted at the output of the differential group delay time compensator, and is passed on to a PMD detection device.

The latter determines, for example, the quality of the light wave signal received, and hence, indirectly, the polarization mode dispersion (PMD) that has occurred in each case. As a reaction to this, appropriate control signals may be supplied to the polarization control device or devices, so that the polarization of the light wave passing through the respective polarization control device is changed appropriately. The light wave that emerges from the respective polarization control device is then supplied to the appropriate downstream birefringent element. Depending on the respective polarization state, as influenced by the polarization control device, the light waves are passed through the respective birefringent element with group delay times of different magnitude. This makes it possible to compensate (approximately) for the polarization mode dispersion (PMD) which has already occurred in the optical waveguide.

In the simplest case, a differential group delay time compensator has only a single PMD compensation device and only a single birefringent element. Only first-order polarization mode dispersion (PMD) can be compensated for in this case.

In order to compensate (approximately) for higher-order polarization mode dispersion (PMD) (that is to say, taking account of the wavelength dependency of the PSP and the differential group delay time (DGD)), the respective PMD compensation device must have, for example, a number of birefringent elements, connected in series, with polarization control devices connected between them, or a number of PMD compensation devices must be used.

An object of the present invention is to provide a novel apparatus for compensating for polarization mode dispersion (PMD) which is caused during transmission of a light wave via an optical waveguide, of providing a novel optical communication network having such an apparatus, and of providing a novel method for compensating for polarization mode dispersion (PMD) which is caused during transmission of a light wave via an optical waveguide.

SUMMARY OF THE INVENTION

According to one fundamental embodiment of the present invention, an apparatus is provided for compensating for polarization mode dispersion (PMD) which is caused during transmission of a light wave via an optical waveguide, which apparatus has at least one first and one second polarization mode dispersion compensation device, and a control device which controls at least the first polarization mode dispersion compensation device, with the light wave being supplied first of all to the first compensation device, which at least partially carries out polarization mode dispersion compensation on the supplied light wave, and with the light wave that is emitted from the first compensation device then being supplied to the second compensation device which carries out further polarization mode dispersion compensation on the light wave, and with the apparatus having a PMD detection device, which provides information relating to the polarization mode dispersion of the light wave that is emitted from the first compensation device, and the first compensation device being controlled by the control device using the information relating to the polarization mode dispersion of the light wave that is emitted from the first compensation device.

In one particularly advantageous embodiment, the apparatus also has a second PMD detection device which provides information relating to the polarization mode dispersion of the light wave that is supplied to the first compensation device and/or a further PMD detection device which provides information relating to the polarization mode dispersion of the light wave that is emitted from the second compensation device.

The first compensation device is, in this case, preferably controlled by the control device additionally using the information relating to the polarization mode dispersion of the light wave that is supplied to the first compensation device, and/or additionally using the information relating to the polarization mode dispersion of the light wave that is emitted from the second compensation device.

The use of a large number of PMD detection devices allows the (first) compensation device to be driven in a more specific manner than in the prior art.

In one particularly advantageous refinement, the first compensation device is controlled by the control device in order to optimize the compensation for higher-order polarization mode dispersion.

In contrast, the second compensation device is preferably controlled such that it essentially compensates for first-order polarization mode dispersion.

Additional features and advantages of the present invention are described in, and will be apparent from, the following Detailed Description of the Invention and the Figures.

DETAILED DESCRIPTION OF THE INVENTION

Figure 1:
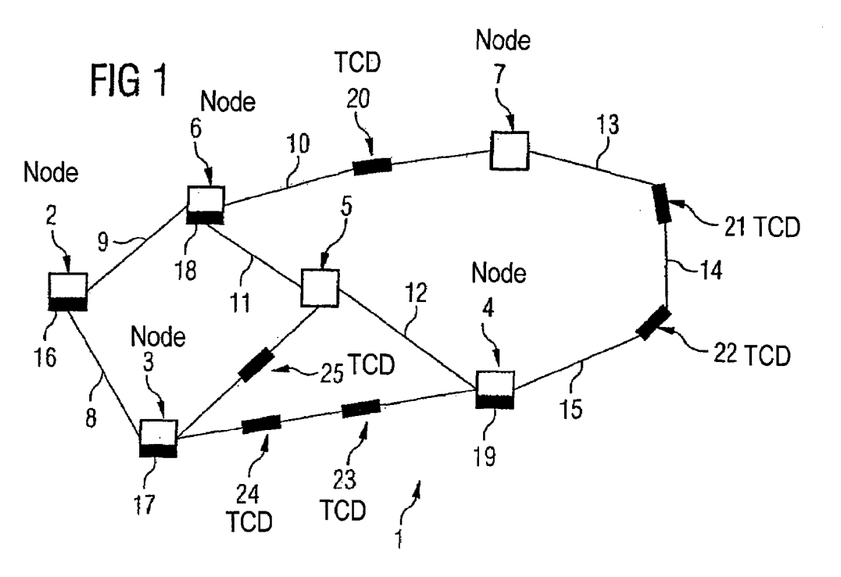
FIG. 1 shows a schematic illustration of an optical communication network.

FIG. 1 shows an optical communication network 1. This communication network 1 has a large number of network nodes 2, 3, 4, 5, 6, 7, which are connected to one another via individual optical waveguides 8, 9, 10, 11, 12, 13, 14, 15 or via appropriate bundles of optical waveguides.

Optical signals are transmitted at a high data rate via the optical waveguides 8, 9, 10, 11, 12, 13, 14, 15 between the individual network nodes 2, 3, 4, 5, 6, 7 (for example, OTDM signals S at a data rate of more than 10 Gb/s, such as 160 Gb/s (OTDM=Optical Time Division Multiplexing)).

An OTDM signal S includes a number of individual signals, each of which is allocated to a number of (cyclically successive) time slots.

When the optical signals are transmitted via appropriate light waves which are fed into the optical waveguides 8, 9, 10, 11, 12, 13, 14, 15, the interference caused by noise, crosstalk, delay time differences, etc., accumulates.

Optical signal regeneration devices 16, 17, 18, 19, in this case 3R regenerators, are used in this case to compensate for the interference effect. A received optical signal is amplified, retimed and reshaped in the 3R regenerators (Reamplifying, Retiming, Reshaping) and is then passed on.

The signal regeneration devices 16, 17, 18, 19 in the present exemplary embodiment are arranged directly adjacent to the network nodes 2, 3, 4, 5, 6, 7, or are part of a network node 2, 3, 4, 5, 6, 7. In alternative exemplary embodiments, which are not described here, the signal regeneration devices 16, 17, 18, 19 also may be arranged between the network nodes 2, 3, 4, 5, 6, 7.

While the light waves are transmitted via the optical waveguides 8, 9, 10, 11, 12, 13, 14, 15, polarization mode dispersion (PMD) occurs (for example, caused by small asymmetries and mechanical stresses in the core of the optical waveguides 8, 9, 10, 11, 12, 13, 14, 15). This leads to group delay times of different magnitude in the respective optical waveguides 8, 9, 10, 11, 12, 13, 14, 15 for different input polarization states of the respective light wave. Signal distortion therefore can occur, depending on the respective input polarization.

In order to compensate (approximately) for polarization mode dispersion (PMD) and in order to increase the path lengths which can be bridged without regenerators, the optical communication network 1 has a number of differential group delay time compensator devices 20, 21, 22, 23, 24, 25.

In the exemplary embodiment described here, one or more differential group delay time compensator devices 20, 21, 22, 23, 24, 25 are, in each case, arranged between each two network nodes 2, 3, 4, 5, 6, 7.

In alternative, particularly advantageous, exemplary embodiments, which are not described here, the differential group delay time compensator devices 20, 21, 22, 23, 24, 25 also may, for example, be arranged directly adjacent to the network nodes 2, 3, 4, 5, 6, 7, or may be part of a network node 2, 3, 4, 5, 6, 7.

Figure 2:
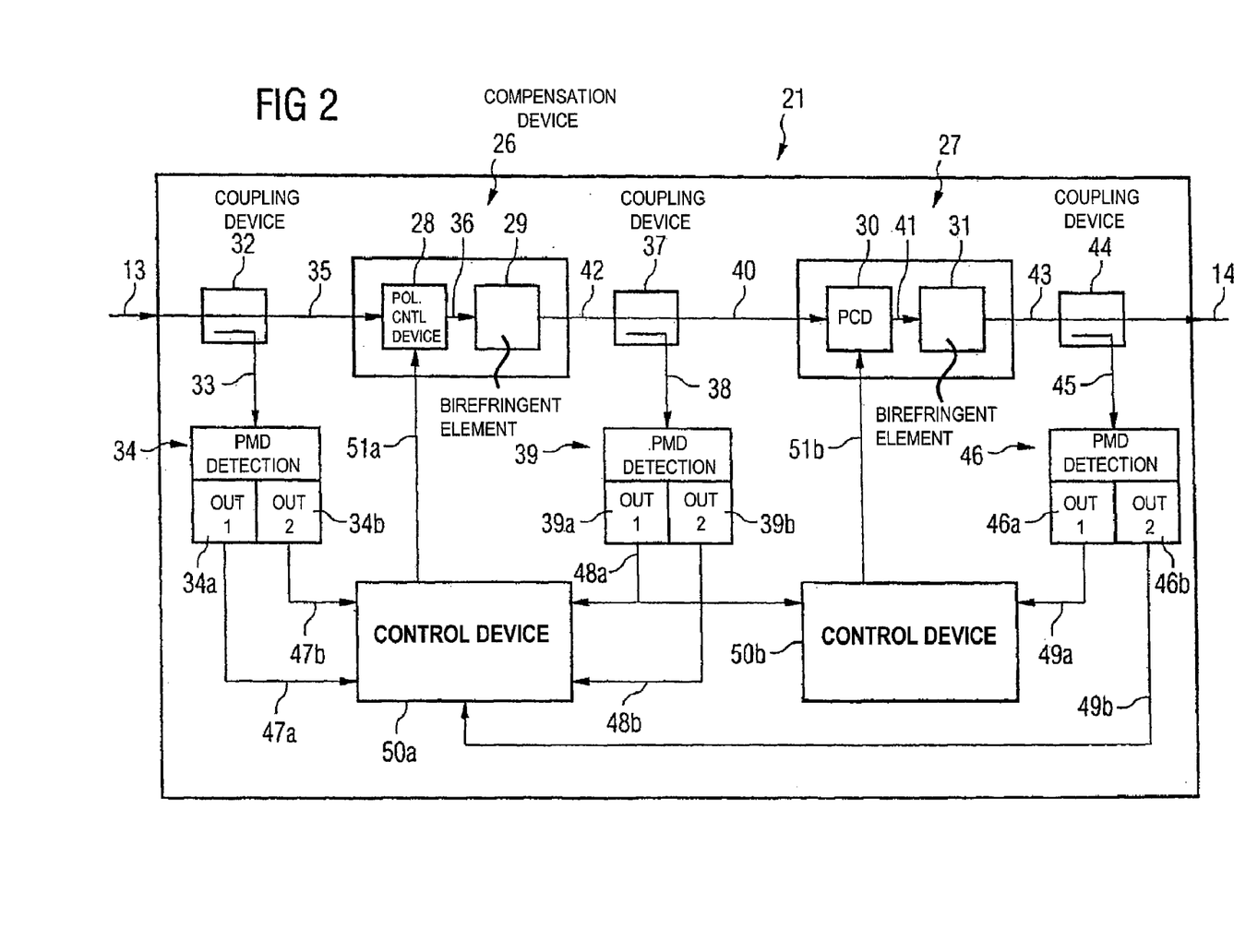
FIG. 2 shows a schematic detailed illustration of one exemplary embodiment of a differential group delay time compensation device according to the present invention.

By way of example, FIG. 2 shows the design of the differential group delay time compensator device 21 as shown in FIG. 1. The other differential group delay time compensator devices 20, 21, 22, 23, 24, 25 are designed in a correspondingly similar manner; for example, the differential group delay time compensator device 21 shown in FIG. 2.

The input of the differential group delay time compensator device 21 is connected to the optical waveguide 13, and the output of the differential group delay time compensator device 21 is connected to the optical waveguide 14.

The differential group delay time compensator device 21 has a number of series-connected PMD compensation devices 26, 27 (in this case two, but alternatively, for example, three or four).

These each have a polarization control device 28, 30 and a birefringent element 29, 31 (for example, a polarization-maintaining optical fiber) connected downstream from the respective polarization control device 28, 30. In other exemplary embodiments, by way of example, it is also possible to use components which combine the function of a polarization control device and of a birefringent element, in which case the two functions also may be carried out at the same time and in parallel with one another.

The light wave which is carried in the optical waveguide 13 is supplied, at the input of the differential group delay time compensation device 21 to a first optical coupling device 32. A (small) proportion of the light wave is emitted there, and is passed on via an optical waveguide 33 to the first of a number of PMD detection devices 34 (in this case three, but alternatively, for example, four or five).

The (remaining, largest) proportion of the light wave is supplied from the first optical coupling device 32 via an optical waveguide 35 to the polarization control device 28 in the first PMD compensation device 26, and from there via an optical waveguide 36 to the birefringent element 29 in the first PMD compensation device 26.

The light wave is then supplied from the birefringent element 29 via an optical waveguide 42 to a second optical coupling device 37. A (small) proportion of the light wave is once again emitted there, and is passed on via an optical waveguide 38 to a second PMD detection device 39. The (remaining, largest) proportion of the light wave is supplied from the second optical coupling device 37 via an optical waveguide 40 to the polarization control device 30 in the second PMD compensation devices 27, and from there via an optical waveguide 41 to the birefringent element 31 in the second PMD compensation device 27.

The light wave is then supplied from the birefringent element 31 via an optical waveguide 43 to a third optical coupling device 44. A (small) proportion of the light wave is once again emitted there, and is passed on via an optical waveguide 45 to a third PMD detection device 46. The (remaining, largest) proportion of the light wave is fed from the third optical coupling device 44 at the output of the differential group delay time compensator device 21 into the optical waveguide 14 (and is then passed on in the direction of the network node 19, as shown in FIG. 1).

Furthermore, with reference to FIG. 2, the polarization mode dispersion (PMD) which occurs in each of these light waves that are supplied to it, is determined in the PMD detection device 34, 39, 46 or, alternatively, the quality of the respective light wave signal is determined (and hence, indirectly, the polarization mode dispersion (PMD) that has occurred).

The PMD detection devices 34, 39, 46 each have an opto-electronic conversion device, such as a photodiode, which converts the supplied optical signal to a corresponding electrical signal. This is supplied to a number of bandpass filter devices (for example, three or four), which each pass different frequency bands. The strength of the signal that is emitted from the respective bandpass filter devices and, thus, the magnitude of (for example, three or four) spectral components of the above-mentioned electrical signal, is determined via appropriate measurement devices.

A computation device which is provided in each of the PMD detection devices 34, 39, 46 can use this information to determine the quality of the respective light wave signal; for example, the quality of the corresponding signal eye (and hence, indirectly, the polarization mode dispersion (PMD) which has occurred).

Alternatively, appropriate devices can be used to directly determine the first-order polarization mode dispersion, and to determine the higher-order polarization mode dispersion.

The electrical signals which represent the first-order polarization mode dispersion that has been determined may, in each case, be tapped off at a first output 34a, 39a, 46a of the respective PMD detection device 34, 39, 46, and the electrical signals which represent the higher-order polarization mode dispersion which has been determined may, in each case, be tapped off at a second PMD detection device output 34b, 39b, 46b. Alternatively, signals which represent the signal quality that has been determined (and hence, indirectly, the polarization mode dispersion that has occurred) can be tapped off at one (or more) of the above-mentioned outputs 34a, 39a, 46a.

In alternative exemplary embodiments, the polarization mode dispersion (overall or separately based on first-order and higher-order polarization mode dispersion) also may be determined in any other desired manner in all or in some of the PMD detection devices 34, 39, 46. For example, the polarization level of the respective spectral components of the light waves can be measured, or any other desired variable which is influenced by polarization mode dispersion.

As is also shown in FIG. 2, the differential group delay time compensation device 21 has two PMD compensation device control devices 50a, 50b (or alternatively, for example, three or four).

The electrical signals which represent the first-order polarization mode dispersion that has been determined can be supplied via lines 47a, 48a, 49a from the respective first outputs 34a, 39a, 46a of the respective PMD detection device 34, 39, 46 to the (respectively desired) PMD compensation device control devices 50a, 50b.

In a corresponding manner, the electrical signals which represent the higher-order polarization mode dispersion that has been determined can be supplied via lines 47b, 48b, 49b from the respective second outputs 34b, 39b, 46b of the respective PMD detection device 34, 39, 46 to the (respectively desired) PMD compensation device control devices 50a, 50b.

As is shown in FIG. 2, in the present exemplary embodiment, the first PMD compensation device control device 50a is supplied via the lines 47b, 48b, 49b from all the PMD detection devices 34, 39, 46 with the electrical signals which, in each case, represent the higher-order polarization mode dispersion that has been determined. In a corresponding manner, the first PMD compensation device control device 50a is supplied via the lines 47a, 48a from the first and second PMD detection devices 34, 39 (that is to say, not from the third PMD detection device 46) with the electrical signals which, in each case, represent the first-order polarization mode dispersion that has been determined.

Furthermore, in the present exemplary embodiment, the second PMD compensation device control device 50b is supplied via the lines 48a, 49a from the second and third PMD detection devices 39, 46 with the electrical signals which, in each case, represent the first-order polarization mode dispersion that has been determined (but not with signals which represent the higher-order polarization mode dispersion that has been determined).

In alternative exemplary embodiments, the PMD compensation device control devices 50a, 50b are supplied with other subsets of the electrical signals which are available and represent the first-order or higher-order polarization mode dispersion or, for example, with all the electrical signals which are made available by all the PMD detection devices 34, 39, 46.

As will be described in more detail in the following text, the first control device 50a uses the abovementioned electrical signals which have been received from the PMD detection devices 34, 39, 46, and which represent the first-order and higher-order polarization mode dispersion, to determine the PMD compensation to be achieved in the PMD compensation device 26 associated with it and, via a line 51a, sends an appropriate electrical control signal to the first polarization control device 28. Alternatively, instead of a single control signal, a number of control signals also may be used, which are transmitted via a number of lines (for example, via three or four), and in particular via more than 10 lines.

In one alternative exemplary embodiment, a so-called gradient method also may be used, in which the control device 50a (slowly) changes the control signal or control signals, and assesses the result of the change on the basis of the signal quality that is determined by the appropriate PMD detection devices.

The polarization of the light wave passing through the polarization control device 28 is changed in the first polarization control device 28 as a function of the electrical control signal received via the line 51a. As explained above, the light wave which emerges from the polarization control device 28 is then supplied via the optical waveguide 36 to the birefringent element 29.

The light wave is passed through the birefringent element 29 with group delay times of different magnitude depending on the respective polarization state, which is influenced by the polarization control device 28. As will be explained in more detail further below, it is possible to partially compensate for the polarization mode dispersion (PMD) which is caused by the light wave passing through the optical waveguide 13. In the present exemplary embodiment, the first PMD compensation device 26 is driven such that it predominantly compensates for higher-order polarization mode dispersion (see below).

In a correspondingly similar manner to that in the first control device 50a, the second control device 50b also uses the abovementioned electrical signals which are received from the PMD detection devices 39, 46 (and which represent first-order polarization mode dispersion) to determine the PMD compensation to be achieved in the PMD compensation device 27 which is associated with the second control device 50b. As a reaction to this, the second control device 50b sends, via a line 51b, an appropriate electrical control signal to the second polarization control device 30. Alternatively, instead of a single control signal, a number of control signals also may be used, which are transmitted via a number of lines; for example, via three or four and, in particular, via more than 10 lines.

In an alternative exemplary embodiment, the second control device 50b also may use a so-called gradient method, in which the second control device 50b (slowly) changes the control signal or signals, and assesses the result of the change on the basis of the signal quality which is determined by the appropriate PMD detection devices.

The polarization of the light wave passing through the polarization control device 30 is changed in the second polarization control device 30 as a function of the electrical control signal which is received via the line 51b. As explained above, the light wave which emerges from the polarization control device 30 is then supplied via the optical waveguide 41 to the birefringent element 31.

The light wave is passed through the birefringent element 31 with group delay times of different magnitude as a function of the respective polarization state, which is influenced by the polarization control device 30. As will be explained in more detail further below, it is thus possible to (approximately completely) compensate for the polarization mode dispersion which is caused by the light wave passing through the optical waveguide 13 and which already has been partially compensated for by the first PMD compensation device 26. In the present exemplary embodiment, the second PMD compensation device 27 is driven such that it predominantly compensates for the first-order polarization mode dispersion (see below).

The control concept which is used in the present exemplary embodiment in order to compensate for polarization mode dispersion will be described in the following text with reference to FIG. 3.

The polarization mode dispersion behavior of optical waveguides, such as of the optical waveguide 13 shown in FIGS. 1 and 2, can be described in the form of a model approximately via a large number of birefringent elements which are connected in series and whose optical (major) axes are each rotated with respect to one another.

Figure 3:
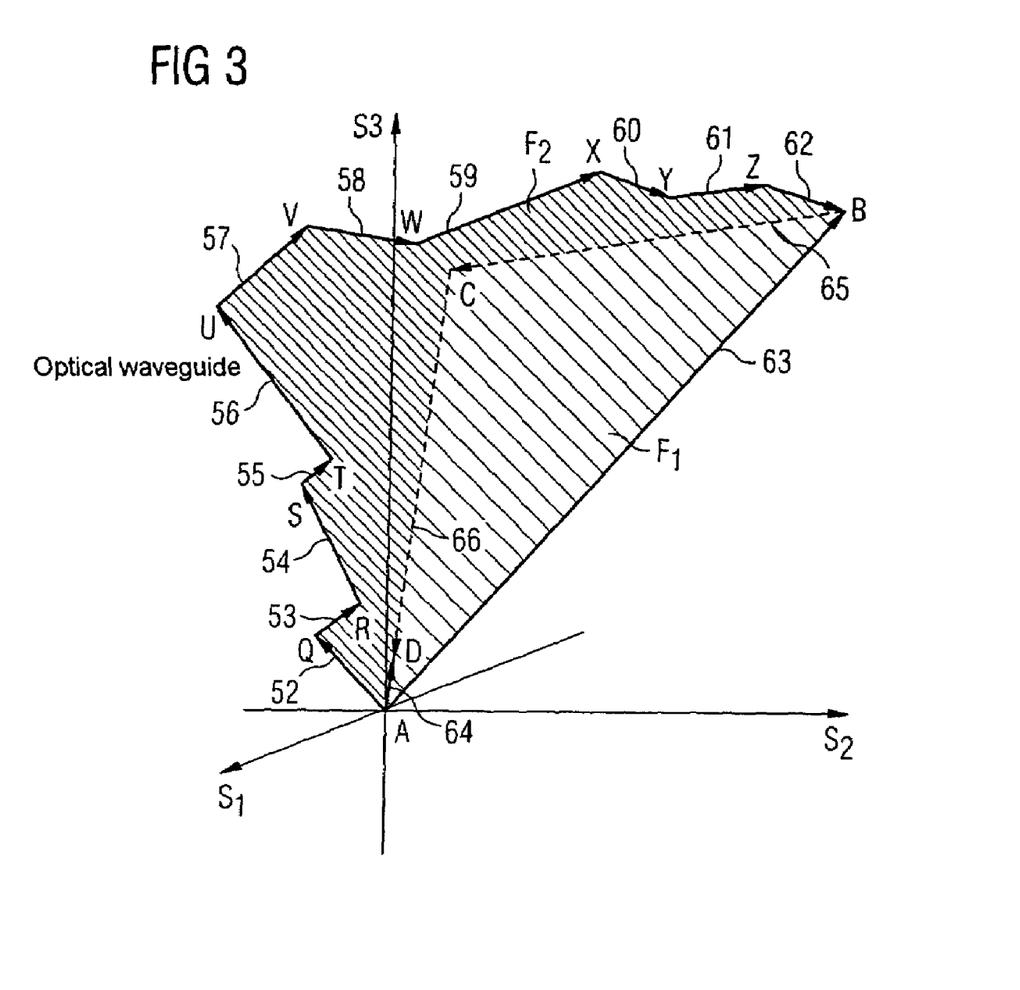
FIG. 3 shows a schematic illustration of polarization mode dispersion, which is illustrated on the basis of PMD vectors in Stokes space, and which occurs in different optical waveguides.

FIG. 3 uses PMD vectors in Stokes space to illustrate the polarization mode dispersion which is caused by the various birefringent elements of the optical waveguide 13.

The polarization mode dispersion which is caused by a first birefringent element is illustrated by a vector 52 running from the point A to the point Q, the polarization mode dispersion which is caused by a second birefringent element is illustrated by a vector 53 running from the point Q to the point R, the polarization mode dispersion which is caused by a third birefringent element is illustrated by a vector 54 running from the point R to the point S, and the polarization mode dispersion which is caused by the subsequent birefringent elements is illustrated by the vectors 55, 56, 57, 58, 59, 60, 61, 62.

The orientation of the PMD vectors 52, 53, 54, 55, 56, 57, 58, 59, 60, 61, 62 in Stokes space, in each case, illustrates the orientation of the two PSP (Principal States of Polarization), and their length indicates the associated differential group delay time (DGD).

The length of the sum vector 63 of the abovementioned vectors 52, 53, 54, 55, 56, 57, 58, 59, 60, 61, 62, that is to say the length of the vector 63 running from the point A to the point B, thus illustrates the magnitude of the total differential group delay times (DGD) which occur in the optical waveguide 13.

The fact that the chain of individual vectors 52, 53, 54, 55, 56, 57, 58, 59, 60, 61, 62 and the sum vector 63 enclose an area $F_1$ (illustrated by the shading in FIG. 3), shows that the differential group delay time (DGD) of the fiber is not constant, but depends on the wavelength of the respective light wave. The size of the enclosed area $F_1$ represents the amount of higher-order polarization mode dispersion (PMD).

As is shown in FIG. 2, the differential group delay time compensator device 21 in the present exemplary embodiment has two PMD compensation devices 26, 27. As explained above, these compensate, at least partially, for the polarization mode dispersion which is caused by the optical waveguide 13.

In this case, as shown in FIG. 3, the polarization mode dispersion compensation which is achieved by the first PMD compensation device 26 can be illustrated by a vector 65 running from the point B to the point C, and the polarization mode dispersion compensation achieved by the second PMD compensation device 27 can be illustrated by a vector 66 running from the point C to the point D.

The chain of (individual) vectors 65, 66 illustrates the total polarization mode dispersion compensation achieved by the differential group delay time compensator device 21.

Thus, in the case of a light wave which enters the optical waveguide 14 at the output of the differential group delay time compensator device 21, only (relatively small residual) polarization mode dispersion still occurs which, in the illustration shown in FIG. 3, is illustrated by a vector 64 running from the point A to the point D. This is the result of the sum of the abovementioned vectors 52, 53, 54, 55, 56, 57, 58, 59, 60, 61, 62 which illustrate the PMD occurring in the optical waveguide 13 and the vectors 65, 66 which illustrate the PMD compensation.

The length of the vector 64 represents the amount of the remaining first-order polarization mode dispersion (PMD). The size of the area $F_2$ (which is illustrated by the double shading in FIG. 3) enclosed by the chain of the abovementioned vectors 52, 53, 54, 55, 56, 57, 58, 59, 60, 61, 62 represents the amount of higher-order polarization mode dispersion (PMD).

The first and second PMD compensation devices 26, 27 are driven by the control devices 50a, 50b such that (on the one hand) the amount of remaining first-order polarization mode dispersion (PMD) is as low as possible (that is to say, the vector 64 is as short as possible) and such that (on the other hand) the amount of remaining higher-order polarization mode dispersion (PMD) is also as small as possible (that is to say, the area $F_2$ is as small as possible).

As already mentioned, the control device 50a drives the first PMD compensation device 26 such that it compensates predominantly for higher-order polarization mode dispersion. The polarization of the light wave passing through the polarization control device 28 is changed in the first polarization control device 28 of the first PMD compensation device 26 as a function of the supplied control signal. Thus, in the illustration shown in FIG. 3, the end point C of the vector 65, which illustrates the PMD compensation achieved by the PMD compensation device 26, may be rotated by any desired amount about the vector start point B. If the (sole) aim was for the first PMD compensation device 26 to compensate for first-order PMD, the first PMD compensation device 26 would be driven such that the vector 65 points in the direction of the point A. Instead of this, in the present exemplary embodiment, the first PMD compensation device 26 compensates predominantly for higher-order polarization mode dispersion, that is to say the first PMD compensation device 26 is driven by the first PMD compensation device control device 50a, such that the area $F_2$ which is enclosed between the vectors 65, 66, 64 and the vectors 52, 53, 54, 55, 56, 57, 58, 59, 60, 61, 62 is as small as possible.

As already explained, in the present exemplary embodiment, the first PMD compensation device control device 50a is supplied via the lines 47b, 48b, 49b from all the PMD detection devices 34, 39, 46 with electrical signals which, in each case, represent the higher-order polarization mode dispersion that has been determined, and are supplied via the lines 47a, 48a from the first and second PMD detection devices 34, 39 (that is to say, not from the third PMD detection device 46) with the electrical signals which respectively represent the first-order polarization mode dispersion which has been determined.

The signals which are supplied from the first PMD detection device 34 (upstream of the first PMD compensation device 26) are used by the control device 50a as reference signals. Signals which are supplied from the second PMD detection device 39 (downstream from the first PMD compensation device 26) can be used directly to assess the PMD compensation achieved by the first PMD compensation device 26, so that the setting of the polarization control device 28 can be changed or optimized directly, if required, by the control device 50a.

As already explained, the second PMD compensation device control device 50b is, in the present exemplary embodiment, supplied via the lines 48a, 49a from the second and third PMD detection devices 39, 46 with the electrical signals which, in each case, represent the first-order polarization mode dispersion that has been determined (but not with signals which represent the higher-order polarization mode dispersion that has been determined).

The control signals which are sent from the control device 50b via the line 51b in order to drive the second PMD compensation device 27 are chosen, in the present exemplary embodiment, such that the second PMD compensation device 27 compensates as optimally as possible for first-order PMD.

The signals which are supplied from the second PMD detection device 39 (upstream of the second PMD compensation device 27) are used by the control device 50b as reference signals. The signals which are supplied from the third PMD detection device 46 (downstream from the second PMD compensation device 27) can be used directly to assess the PMD compensation achieved by the second PMD compensation device 27, so that the setting of the polarization control device 30 can be changed or optimized directly, if required, by the control device 50b.

Since a large number of PMD detection devices 34, 39, 46 are used, the PMD compensation devices 26, 27 can be driven in a more specific manner than in the case of the prior art.

Although the present invention has been described with reference to specific embodiments, those of skill in the art will recognize that changes may be made thereto without departing from the spirit and scope of the present invention as set forth in the hereafter appended claims.

The invention claimed is:

1. An apparatus for compensating for polarization mode dispersion caused during transmission of a light wave via an optical waveguide, comprising:
at least one first polarization mode dispersion compensation device, wherein the light wave is first supplied to the first compensation device which, in turn, at least partially carries out polarization mode dispersion compensation on the supplied light wave;
at least one second polarization mode dispersion compensation device, wherein a light wave which is emitted from the first compensation device is supplied to the second compensation device which, in turn, carries out further polarization mode dispersion compensation on the light wave;
a control device for controlling at least the first polarization mode dispersion compensation device;
a first polarization mode dispersion detection device for providing information relating to the polarization mode dispersion of the light wave emitted from the first compensation device before supplying the light wave to a second compensation device, wherein the first compensation device is controlled by the control device using the information relating to the polarization mode dispersion of the light wave that is emitted from the first compensation device, wherein
a second polarization mode dispersion detection device provides information relating to the polarization mode dispersion of the light wave supplied to the first compensation device, and wherein the first compensation device is controlled by the control device additionally using the information relating to the polarization mode dispersion of the light wave supplied to the first compensation device; and
a third polarization mode dispersion detection device for providing information relating to the polarization mode dispersion of a light wave that is emitted from the second compensation device, wherein the first compensation device is controlled by the control device additionally using the information relating to the polarization mode dispersion of the light wave emitted from the second compensation device.

2. An apparatus for compensating for polarization mode dispersion as claimed in claim 1, wherein the information relating to the polarization mode dispersion of the light wave emitted from the first compensation device contains information relating to higher-order polarization mode dispersion.

3. An apparatus for compensating for polarization mode dispersion as claimed in claim 1, wherein the first compensation device is controlled by the control device so as to optimize compensation for higher-order polarization mode dispersion.

4. An apparatus for compensating for polarization mode dispersion as claimed in claim 1, wherein the second compensation device is controlled using the information relating to the polarization mode dispersion of the light wave emitted from the first compensation device.

5. An apparatus for compensating for polarization mode dispersion as claimed in claim 4, wherein the second compensation device is additionally controlled using the information relating to the polarization mode dispersion of the light wave emitted from the second compensation device.

6. An apparatus for compensating for polarization mode dispersion as claimed in claim 1, wherein the second compensation device is controlled such that it substantially compensates for first-order polarization mode dispersion.

7. An apparatus for compensating for polarization mode dispersion as claimed in claim 6, wherein the information used to control the second compensation device contains information relating to the first-order polarization mode dispersion of the light wave emitted from at least one of the first compensation device and the second compensation device.

8. An apparatus for compensating for polarization mode dispersion as claimed in claim 7, wherein the information used to control the second compensation device does not contain any information relating to higher-order polarization mode dispersion of the light wave emitted from at least one of the first compensation device and the second compensation device.

9. An optical communication network, comprising:
at least one optical waveguide; and
an apparatus that compensates for polarization mode dispersion caused during transmission of a light wave via the at least one optical wave guide, the apparatus including at least a first and a second polarization mode dispersion compensation device;
a control device for controlling at least the first polarization mode dispersion compensation device, with the light wave first being supplied to the first compensation device which, in turn, at least partially carries out polarization mode dispersion compensation on the supplied light wave, and with a light wave which is emitted from the first compensation device then being supplied to the second compensation device which, in turn, carries out further polarization mode dispersion compensation on the light wave; and
a polarization mode dispersion detection device for providing information relating to the polarization mode dispersion of the light wave that is emitted from the first compensation device, with the first compensation device being controlled by the control device using the information relating to the polarization mode dispersion of the light wave emitted from the first compensation device and providing information relating to the polarization mode dispersion of a light wave that is emitted from the second compensation device, wherein the first compensation device is controlled by the control device additionally using the information relating to the polarization mode dispersion of the light wave emitted from the second compensation device.

10. A method for compensating for polarization mode dispersion caused during transmission of a light wave via an optical waveguide, comprising:
supplying a light wave to a first polarization mode dispersion compensation device which, in turn, at least partially carries out polarization mode dispersion compensation on the supplied light wave;
supplying a light wave emitted from the first compensation device to a second polarization mode dispersion compensation device which, in turn, carries out further polarization mode dispersion compensation on the light wave;
controlling at least the first polarization mode dispersion compensation device via a control device;
providing information relating to the polarization mode dispersion of the light wave emitted from the first compensation device via a first polarization mode dispersion detection device before supplying the light wave to a second compensation device, wherein the first compensation device is controlled by the control device using the information relating to the polarization mode dispersion of the light wave that is emitted from the first compensation device;

providing information relating to the polarization mode dispersion of the light wave supplied to the first compensation device via a second polarization mode dispersion detection device, wherein the first compensation device is controlled by the control device additionally using the information relating to the polarization mode dispersion of the light wave supplied to the first compensation device; and providing information relating to the polarization mode dispersion of a light wave that is emitted from the second compensation device via a third polarization mode dispersion detection device, wherein the first compensation device is controlled by the control device additionally using the information relating to the polarization mode dispersion of the light wave emitted from the second compensation device.

* * * * *